(12) United States Patent
Krammer

(10) Patent No.: US 9,802,501 B2
(45) Date of Patent: Oct. 31, 2017

(54) GUIDED VEHICLE POSITIONING FOR INDUCTIVE CHARGING WITH THE ASSISTANCE OF A VEHICLE CAMERA

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/924,995

(22) Filed: Oct. 28, 2015

(65) Prior Publication Data
US 2016/0046198 A1    Feb. 18, 2016

Related U.S. Application Data

(63) Continuation of application No. PCT/EP2014/058054, filed on Apr. 22, 2014.

(30) Foreign Application Priority Data

Apr. 30, 2013  (DE) ........................ 10 2013 207 906

(51) Int. Cl.
*B60L 9/00*    (2006.01)
*B60L 11/18*   (2006.01)
(Continued)

(52) U.S. Cl.
CPC ......... *B60L 11/1833* (2013.01); *B60L 11/182* (2013.01); *B60L 11/1829* (2013.01);
(Continued)

(58) Field of Classification Search
USPC ........................................................ 701/22
See application file for complete search history.

(56) References Cited

U.S. PATENT DOCUMENTS

| 2009/0040068 A1* | 2/2009 | Oyobe | .................. B60L 11/123 340/932.2 |
| 2009/0085522 A1 | 4/2009 | Matsumoto | |

(Continued)

FOREIGN PATENT DOCUMENTS

| DE | 10 2008 046 215 A1 | 9/2009 |
| DE | 10 2011 111 051 A1 | 3/2012 |

(Continued)

OTHER PUBLICATIONS

International Search Report (PCT/ISA/210) issued in PCT Application No. PCT/EP2014/058054 dated Sep. 10, 2014 with English translation (seven pages).

(Continued)

*Primary Examiner* — Hussein A. Elchanti
(74) *Attorney, Agent, or Firm* — Crowell & Moring LLP

(57) ABSTRACT

A method and a corresponding device are provided for positioning a vehicle above a primary coil for inductive charging of a rechargeable battery in the vehicle. A control device for a vehicle is described. The vehicle has a secondary coil for receiving electrical energy from a primary coil outside the vehicle. The vehicle further has at least one camera, which is designed to detect an environment of the vehicle. The control unit is designed to receive image data from the at least one camera of the vehicle and to access reference data. The reference data includes information on at least one predefined reference object in the detected environment of the vehicle and on a position of the at least one predefined reference object relative to the primary coil. The control unit detects the at least one predefined reference object in the received image data on the basis of the reference data. In addition, the control unit determines a position of the secondary coil relative to the primary coil on the basis of the detected at least one reference object.

19 Claims, 9 Drawing Sheets

(51) Int. Cl.
*B62D 15/02* (2006.01)
*B62D 6/00* (2006.01)
*G05D 1/02* (2006.01)

(52) U.S. Cl.
CPC .......... B60L 11/1835 (2013.01); B62D 6/002 (2013.01); B62D 15/025 (2013.01); G05D 1/0246 (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2011/0082612 | A1 | 4/2011 | Ichikawa |
| 2012/0091959 | A1 | 4/2012 | Martin et al. |
| 2013/0037365 | A1* | 2/2013 | Ichikawa ............... B60L 11/123 191/10 |
| 2013/0179021 | A1* | 7/2013 | Nonaka ............... B60L 11/1816 701/22 |
| 2014/0097671 | A1* | 4/2014 | Nakamura ............... B60L 3/04 307/9.1 |
| 2015/0061576 | A1* | 3/2015 | Chen ..................... B60L 11/182 320/108 |
| 2016/0046194 | A1* | 2/2016 | Tsukamoto ............ H02J 5/005 307/104 |
| 2016/0114687 | A1* | 4/2016 | Ichikawa ................ B60L 5/005 701/22 |

FOREIGN PATENT DOCUMENTS

| | | |
|---|---|---|
| DE | 10 2010 042 395 A1 | 4/2012 |
| DE | 10 2011 006 504 A1 | 10/2012 |
| DE | 10 2012 008 791 A1 | 11/2012 |
| DE | 10 2012 217 258 A1 | 4/2013 |
| EP | 1 930 203 A1 | 6/2008 |
| EP | 2 199 141 A1 | 6/2010 |
| JP | 2010-226945 A | 10/2010 |
| WO | WO 2010/040962 A1 | 4/2010 |
| WO | WO 2011/114208 A2 | 9/2011 |

OTHER PUBLICATIONS

German Search Report issued in counterpart German Application No. 10 2013 207 906.0 dated Nov. 6, 2013 with partial English translation (10 pages).

* cited by examiner

GUIDED VEHICLE POSITIONING FOR INDUCTIVE CHARGING WITH THE ASSISTANCE OF A VEHICLE CAMERA

CROSS REFERENCE TO RELATED APPLICATIONS

This application is a continuation of PCT International Application No. PCT/EP2014/058054, filed Apr. 22, 2014, which claims priority under 35 U.S.C. §119 from German Patent Application No. 10 2013 207 906.0, filed Apr. 30, 2013, the entire disclosures of which are herein expressly incorporated by reference.

BACKGROUND AND SUMMARY OF THE INVENTION

The invention relates to inductive charging of a rechargeable battery in a vehicle. In particular, the invention relates to a method and a corresponding apparatus for positioning a vehicle over a primary coil for inductively charging the rechargeable battery of the vehicle.

Vehicles, particularly vehicles with electric drive, include rechargeable batteries for storing electric power. The rechargeable battery of a vehicle can be charged by connecting it to a vehicle-external power source (e.g. by connecting it to a public power grid), for example. One approach for automatically, wirelessly, inductively charging the battery of the vehicle involves the electric power being transmitted to the battery from the ground to the underbody of the vehicle by way of magnetic induction across the free space under the body. This is shown by way of example in FIG. 1a. In particular, FIG. 1a shows a vehicle 100 having a store 103 for electric power (e.g. having a rechargeable battery 103). The vehicle 100 includes what is known as a secondary coil 102 in the vehicle underbody, the secondary coil 102 being connected to the store 103 by way of impedance matching—not shown—and a rectifier 101.

The secondary coil 102 can be positioned above a primary coil 111, the primary coil 111 being placed on the ground in a garage, for example. The primary coil 111 is connected to a power supply 110. The power supply 110 can be a radiofrequency generator that produces an AC (alternating current) current in the primary coil 111, as a result of which a magnetic field is induced. When there is sufficient magnetic coupling between the primary coil 111 and the secondary coil 102 across the free space 120 under the body, the magnetic field induces a corresponding current in the secondary coil 102. The induced current in the secondary coil 102 is rectified by the rectifier 101 and stored in the store 103 (e.g. in the battery). In this way, electric power can be transmitted wirelessly from the power supply 110 to the energy store 103 of the vehicle 100.

In order to achieve sufficient magnetic coupling between the primary coil 111 and the secondary coil 102, the secondary coil 102 of the vehicle 100 should be positioned above the primary coil 111 (which is also referred to as ground unit) with a certain precision (typically ±10 cm). The present document describes a method and an apparatus that assist a driver of the vehicle 100 in positioning the secondary coil 102 above the primary coil 111. Assistance in positioning is important particularly because the driver cannot see the ground unit 111 in the last phase of positioning the vehicle 100 because the ground unit 111 is then situated under the vehicle 100.

According to one aspect, a control unit for a vehicle is described. The vehicle may be particularly a two-track vehicle, such as a motor car, a road vehicle and/or an automobile. The vehicle includes a secondary coil for picking up electric power from a vehicle-external primary coil. Typically, the secondary coil is attached to an underbody of the vehicle. The vehicle-external primary coil is placed on the ground in a parking space for the vehicle, for example. The primary coil and the secondary coil form a transformer when there is magnetic coupling between the primary coil and the secondary coil. In order to ensure sufficient transmission of electric power from the primary coil to the secondary coil, the distance between the secondary coil and the primary coil (particularly the lateral distance) should reach or fall short of a predefined threshold value. By way of example, the distance may be the geometrical distance between one or more predefined points on the primary coil and one or more predefined points on the secondary coil.

The vehicle includes at least one camera that is set up to capture surroundings of the vehicle. By way of example, the at least one camera may be a front camera that is set up to capture surroundings in front of the vehicle, and/or a rear camera that is set up to capture surroundings behind the vehicle. In particular, the at least one camera can capture surroundings in the direction of travel of the vehicle (e.g. a front camera for forward motion and/or a reversing camera for backward motion). It is also possible to use a multiplicity of cameras in order to capture the surroundings of the vehicle. Furthermore, the vehicle can also include further ambient sensors, such as ultrasonic sensors, which can be used to ascertain a distance to particular objects (e.g. to predefined reference objects) in the surroundings of the vehicle.

The control unit is set up to receive image data from the at least one camera of the vehicle. By way of example, the image data may be an image of the surroundings of the vehicle, which are captured by the camera, at a particular instant and/or may be a sequence of images at a sequence of instants.

Furthermore, the control unit is set up to access reference data. The reference data can include information about at least one predefined reference object in the captured surroundings of the vehicle. By way of example, the reference data can be information about one or more visual features of the at least one reference object that are able to be detected in the image data from the camera. In particular, the reference data can include a graphical reproduction of the at least one reference object, the graphical reproduction being able to be compared with the image data in order to detect the at least one reference object in the image data. Furthermore, the reference data can include information about a physical size of the at least one reference object. The physical size in the reference data can be compared with the size of the at least one detected reference object in the image data in order to ascertain a distance of the camera (and the vehicle) from the at least one reference object.

Furthermore, the reference data can include information about the position of the at least one predefined reference object relative to the primary coil. In particular, the reference data can include information concerning spatial coordinates of the at least one reference object in a predefined coordinate system. In addition, the reference data can include information concerning spatial coordinates of the primary coil in the predefined coordinate system. The respective coordinates then represent the relative position between reference object and primary coil.

The control unit may additionally be set up to take the reference data as a basis for detecting the at least one predefined reference object in the received image data. As set out above, the control unit may be set up particularly to detect a graphical reproduction of the reference object in the image data. Furthermore, the control unit may be set up to take the detected at least one reference object as a basis for ascertaining a position of the secondary coil relative to the primary coil. A position of the detected reference object in the image data can provide information about the position of the vehicle relative to the reference object. In addition, a detected size of the reference object can provide information about the distance between the vehicle and reference object.

In particular, the control unit may be set up to take the detected at least one reference object as a basis for ascertaining a camera angle for a ray between the at least one camera and the at least one reference object. The camera angle indicates the angle at which the vehicle is oriented relative to the at least one reference object. The control unit may be set up to take the ascertained camera angle as a basis for ascertaining a distance of the secondary coil to the at least one reference object. This can involve the use of particularly triangulation methods and/or other trigonometric methods (e.g. application of the triangle rule for simultaneous detection of at least two reference objects in the image data).

The control unit may additionally be set up to receive information concerning a steering turn and concerning a wheel speed of the vehicle. The received information concerning the steering turn and concerning the wheel speed can be taken as a basis for ascertaining a motion of the vehicle. The information concerning the steering turn and the wheel speed can be synchronized to the information obtained from the image data (e.g. to the ascertained camera angle). This can then be used to ascertain a motion (and/or position) of the vehicle relative to the at least one reference object. This can involve the use of triangulation methods, for example.

The reference data can include information about a multiplicity of predefined reference objects. The multiplicity of predefined reference objects may be arranged along an approach trajectory of the vehicle with respect to the primary coil. Thus, the multiplicity of predefined reference objects can assist the entire positioning process for the vehicle. The control unit may be set up to receive a time sequence of image data (particularly a time sequence of images) from the at least one camera of the vehicle along the approach trajectory. In addition, the control unit may be set up to detect the multiplicity of predefined reference objects in the time sequence of image data. The individual reference objects may be detectable on various image data (particularly images or frames) for the sequence of image data. By way of example, this can ensure that at least one predefined reference object can be captured by the at least one camera of the vehicle at every instant in the positioning process. Thus, the positioning process for the vehicle can be assisted continuously. In addition, the control unit may be set up to bypass one or more instants of the positioning process at which a predefined reference object cannot be captured. This can involve the use of vehicle-internal data (such as the steering turn and/or the wheel rotation) in order to ascertain the motion of the vehicle.

The control unit may be set up to receive the reference data from a pilot unit of the primary coil. The reference data can be transmitted via a wireless communication network, for example (e.g. WLAN). This allows the vehicle to approach an unknown charging station, and to be provided with the reference data that are required for the positioning process at the beginning of the positioning operation. The reference data can be stored in a memory unit of the vehicle. The control unit may additionally be set up to use the stored reference data when the same charging station is approached repeatedly. In addition, further data (e.g. an already ascertained intended trajectory of the vehicle) can be used and if need be updated. This allows the positioning operation to be improved when a charging station is approached repeatedly.

The control unit may be set up to prompt a control signal to be sent to the pilot unit of the primary coil in order to illuminate the at least one predefined reference object. The control signal can be transmitted via the abovementioned wireless communication network. Transmission of the control signal ensures that the at least one camera of the vehicle can capture the at least one predefined reference object reliably.

The control unit may be set up to provide information concerning the position of the secondary coil relative to the primary coil for positioning of the secondary coil relative to the primary coil. By way of example, the information concerning the position of the primary coil can be displayed on a screen of the vehicle, and in this way can assist a driver of the vehicle in positioning the vehicle. Alternatively or additionally, the information concerning the position of the primary coil can be provided for a parking assistance function of the vehicle. The control unit may then be set up to prompt the parking assistance function of the vehicle to move the vehicle such that the distance between the secondary coil and the ascertained position of the primary coil reaches or falls below the predefined threshold value (in order to achieve sufficiently great magnetic coupling).

Overall, the use of at least one camera of the vehicle allows precise positioning of the vehicle over a primary coil. The at least one camera of the vehicle is typically already installed for other driver assistance systems (e.g. parking aid) in the vehicle, which means that the use of the at least one camera of the vehicle allows an inexpensive solution for the positioning of the vehicle.

The control unit may be set up to generate a graphical representation of the surroundings of the vehicle with the ascertained position of the primary coil. In this case, it is preferred for the primary coil to be graphically highlighted in the graphical representation in comparison with the surroundings of the vehicle, so that the primary coil is clearly identifiable (e.g. by virtue of highlighted contours). Furthermore, the control unit may be set up to prompt the graphical representation to be output on a screen of the vehicle (e.g. on a central display, e.g. on the center console, of the vehicle).

The graphical representation can comprise a "top view" view of the vehicle and of the surroundings of the vehicle with (a highlighted image of) the primary coil. Furthermore, the graphical representation can include a symbolic representation of the secondary coil in the vehicle. This allows a driver to see the position of the secondary coil and the position of the primary coil simultaneously. This assists the driver in reducing the distance between the secondary coil and the primary coil. Alternatively or additionally, the graphical representation can include a "rear view" view of the vehicle (from a rear camera) or a "front view" view of the vehicle (from a front camera). In particular, images can be combined in an artificial aperture. This makes it possible to take account of images from different cameras with a different angle of vision/position and/or images from one camera over time. This multiplicity of images can be synthesized to produce a new image, the new image showing the surroundings of the vehicle with the detected primary coil from a new angle of vision.

The control unit may be set up to highlight the symbolic representation of the secondary coil separately when the distance between the secondary coil and the primary coil reaches or falls below the predefined threshold value. This makes it possible to display to the driver that the vehicle is positioned such that there is sufficient magnetic coupling between primary coil and secondary coil.

The control unit may be set up to ascertain an intended trajectory for the vehicle that allows the distance between the secondary coil and the primary coil to be reduced such that the distance reaches or falls below the predefined threshold value. Furthermore, the control unit may be set up to take the received information concerning the steering turn as a basis for ascertaining an actual trajectory of the vehicle. A graphical representation of the intended trajectory and the actual trajectory can be output on the screen of the vehicle (e.g. together with the graphical representation of the surroundings of the vehicle). This displays to the driver of the vehicle how he can position the vehicle correctly over the primary coil.

According to a further aspect, a vehicle (particularly a two-track vehicle, e.g. a motor car) is described. The vehicle includes a secondary coil for picking up electric power from a vehicle-external primary coil. Furthermore, the vehicle includes at least one camera that is set up to capture surroundings of the vehicle. In addition, the vehicle includes the control unit described in this document, which control unit is set up to use image data and predefined reference data to assist the positioning process for the secondary coil over the primary coil.

The vehicle can have a memory unit that is set up to store the reference data. Furthermore, the vehicle can have an onboard computer (e.g. as part of an information and communication system of the vehicle) that allows a user to input the reference data. In particular, the onboard computer can include an application for defining reference data that is described in this document. This allows a user of a vehicle to define the reference data (particularly the reference objects) for positioning the vehicle flexibly.

According to a further aspect, a method for assisting in positioning a secondary coil of a vehicle relative to a vehicle-external primary coil is described. The method includes reception of image data from at least one camera of the vehicle, the at least one camera being set up to capture surroundings of the vehicle. Furthermore, the method includes reception or provision of reference data. The reference data can be information about at least one predefined reference object in the captured surroundings of the vehicle. In addition, the reference data can include information about a position of the at least one predefined reference object relative to the primary coil. Moreover, the method includes detection of the at least one predefined reference object in the received image data, on the basis of the reference data. A position of the secondary coil relative to the primary coil can be ascertained on the basis of the detected at least one reference object.

As already explained, the reference data can be information about a multiplicity of predefined reference objects. In particular, the reference data can include information about the relative position of a multiplicity of reference objects. The method can additionally include detection of the multiplicity of predefined reference objects in the received image data. In particular, the actual relative position of the multiplicity of reference objects can be ascertained from the image data. The method can additionally include comparison of the reference data with the detected multiplicity of predefined reference objects. In particular, the information about the relative position of a multiplicity of reference objects can be compared with the actual relative position of the multiplicity of reference objects. From this, it is possible to check the consistency and/or completeness of the information concerning the reference objects. In particular, it is possible to ascertain therefrom an indicator about the reliability of the positioning of the vehicle over the primary coil as performed on the basis of the predefined reference objects.

According to a further aspect, a software (SW) program is described. The SW program can be set up to be executed on a processor and thereby to execute the method described in this document.

According to a further aspect, a storage medium is described. The storage medium can include an SW program that is set up to be executed on a processor and thereby to execute the method described in this document.

It should be noted that the methods, apparatuses and systems described in this document can be used either alone or in combination with other methods, apparatuses and systems described in this document. Furthermore, any aspects of the methods, apparatus and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
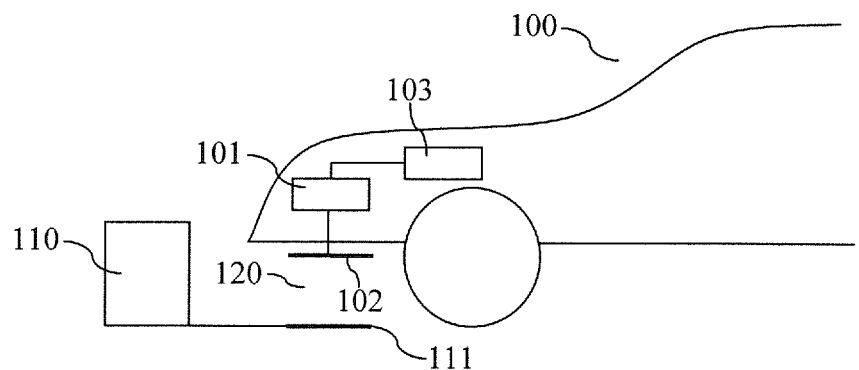
FIG. 1A is a schematic diagram showing an exemplary vehicle that includes a secondary coil for inductively charging a vehicle battery.

As already explained at the outset with respect to FIG. 1A, inductive charging of a vehicle battery 103 requires relatively precise positioning of the secondary coil 102 of the vehicle 100 over the primary coil 111. To assist the driver in positioning, additional vehicle-external units can be used that need to be installed separately in the environment of the parking space. By way of example, the vehicle-external units may be cameras, optical positioning aids, mechanical thresholds, sensors, etc. In addition, additional sensors and/or transmission units can be used in the existing components, such as in the ground unit 111 and in the vehicle 100, in order to assist the driver in positioning. The use of vehicle-external units and/or the use of additional sensors/transmission units increase the costs of an inductive charging system, however. Furthermore, in some systems, assistance in positioning is shown only in direct proximity. This results in the driver needing to perform coarse positioning of the vehicle largely without assistance.

This document describes a method and a corresponding apparatus for assisting the driver in positioning the secondary coil 102 of a vehicle 100 over a primary coil 111. The method described and the apparatus described allow continuous and inexpensive assistance for the positioning operation.

Figure 1B:
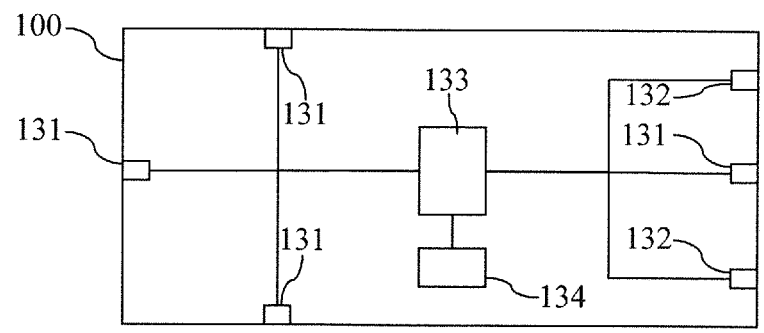
FIG. 1B is a schematic diagram showing an exemplary vehicle with additional ambient sensors.

In particular, one or more of the ambient sensors installed in the vehicle 100 (e.g. cameras and/or ultrasonic sensors) are used for assisting in positioning. FIG. 1*b* shows a vehicle 100 that, in addition to the secondary coil 102, includes ambient sensors 131, 132. In particular, the vehicle 100 includes one or more cameras 131 that are set up to capture visual images of the surroundings of the vehicle 100. In particular, the vehicle 100 can include one or more front cameras 131, one or more side cameras 131 and/or one or more rear cameras 131. Furthermore, the vehicle 100 can include ultrasonic sensors 132 that can be used to ascertain distances to objects in the surroundings of the vehicle for example. Such ambient sensors 131, 132 are already used today for various driver assistance systems (e.g. for parking functions) and, therefore, already exist in many vehicles.

Figure 2A:
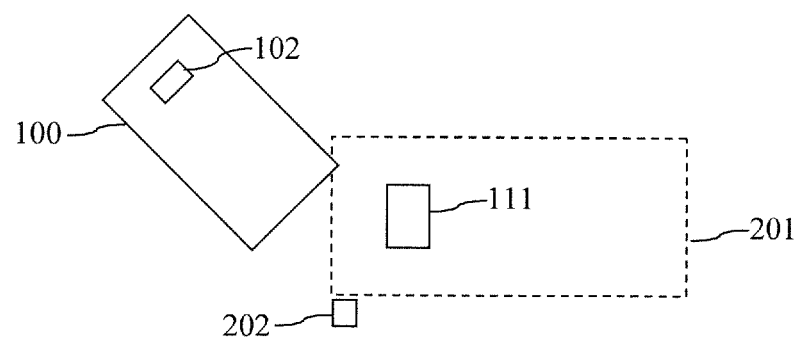
FIG. 2A illustrates an exemplary "top view" representation of the surroundings of the vehicle, produced using ambient sensors of the vehicle.

Using the ambient sensors 131, 132 (particularly using one or more cameras 131), a control unit 133 of the vehicle 100 can produce graphical representations of the surroundings of the vehicle 100 that are able to be displayed to the driver on a screen 134 of the vehicle 100 during positioning of the vehicle 100, and thus assist the driver in positioning the vehicle 100. In particular, a panoramic view of the vehicle 100 (e.g. what is known as a "top view" representation of the vehicle 100) can be produced. An exemplary "top view" representation is shown in FIG. 2*a*. The "top view" representation can be shown on a screen 134 of the vehicle 100 (e.g. in what is known as a head unit). The vehicle 100 itself can be shown in the "top view" representation. In addition, the position of the secondary coil 102 in the vehicle 100 can be displayed. In addition, a graphical representation of the surroundings of the vehicle 100 (e.g. of the rear surroundings of the vehicle 100) can be produced from the data from the ambient sensors 131, 132. In the example shown in FIG. 2*a*, the "top view" representation shows the ground unit 111, for example, and also the boundary 201 of a parking bay and a pillar 202. The "top view" representation typically shows a distortion-corrected image in Cartesian (x-y) coordinates.

Figure 2B:
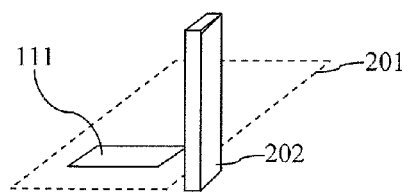
FIG. 2B is a representation of the rear surroundings of the vehicle, produced by a reversing camera of the vehicle.

As an alternative or in addition to the synthetically produced "top view" representation, direct use of the image from a camera 131 of the vehicle (e.g. a rear camera 131) is also possible. An exemplary schematic image from a camera 131 is shown in FIG. 2*b*. The image from a camera 131 (particularly from a "surround camera") is typically distorted, which means that the surroundings of the vehicle 100 are shown in camera coordinates that do not correspond to the Cartesian (x-y) coordinates of the surroundings of the vehicle 100. Nevertheless, the ground unit 111, the boundary 201 of the parking bay 201 and the pillar 202 can also be identified in the camera image.

Figure 3:
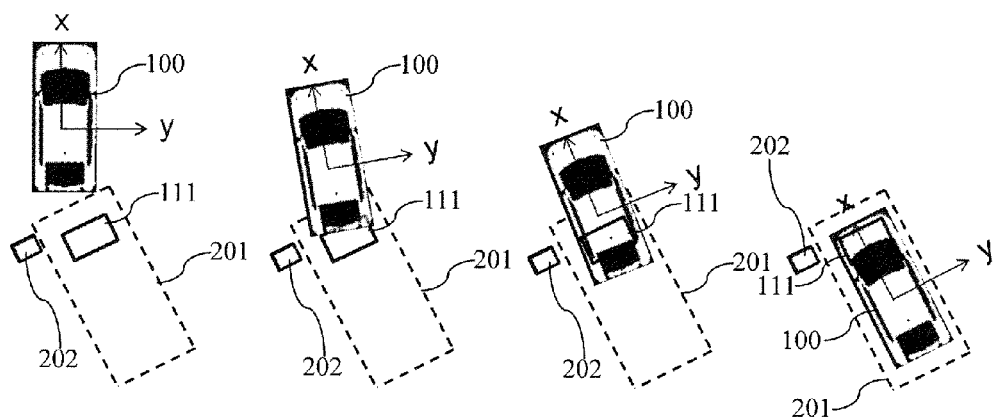
FIG. 3 illustrates an exemplary positioning operation—assisted by the ambient sensors of the vehicle—for positioning the secondary coil of the vehicle over a primary coil.

FIG. 3 shows an exemplary positioning operation in which the vehicle 100 is parked backwards into a parking bay with a ground unit 111. During the positioning operation, a "top view representation" produced from the ambient sensors 131, 132 can be shown on a screen 134 of the vehicle 100. As a result, the driver can be assisted in positioning the vehicle 100. In particular, the control unit 133 may be set up to identify the ground unit 111 from the data from the ambient sensors 131, 132 and to display the ground unit 111 on the graphical representation, even if the ground unit 111 is already concealed by the vehicle 100. This provides the driver with continuous assistance in positioning the vehicle 100.

Figure 4A:
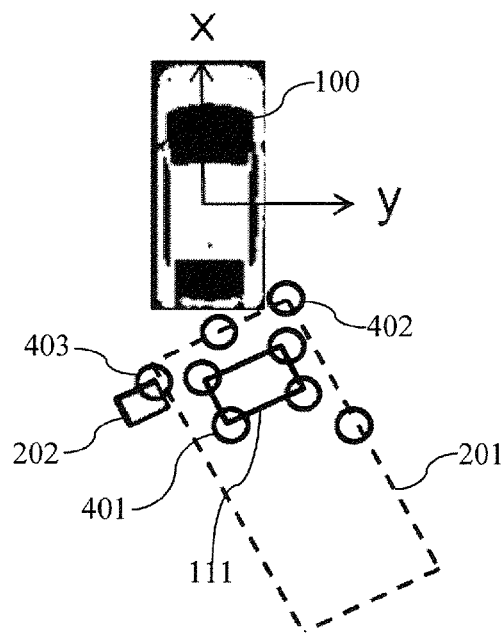
FIG. 4A illustrates exemplary features and reference points in the surroundings of the vehicle that are able to be used for positioning the vehicle.
Figure 4B:
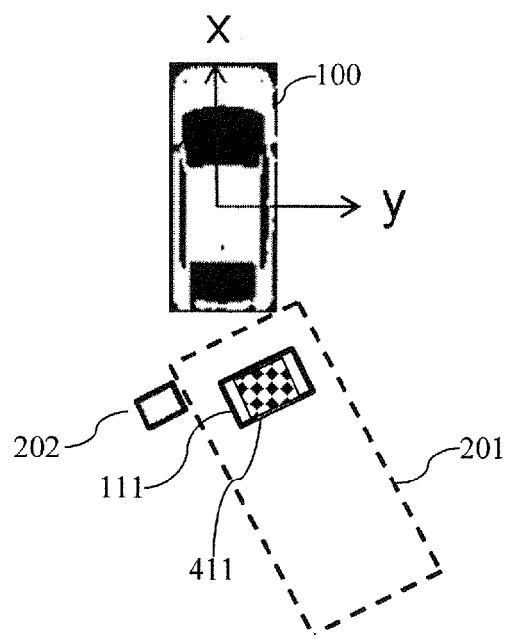
FIG. 4B illustrates the use of a predefined markings when positioning the vehicle.

The control unit 133 may therefore be set up to identify the ground unit 111 on the basis of the data from the ambient sensors 131, 132 (particularly on the basis of the images from the one or more cameras 131) (e.g. using image processing algorithms). To assist in the automatic identification of the ground unit 111, the ground unit 111 can include specific visual features and/or reference points that can be identified by the control unit. As FIG. 4*a* shows, the corners 401 of the ground unit 111 can be ascertained as reference points, for example. Furthermore, the edges of the ground unit 111 can be identified as reference points. These allow the dimensions of the ground unit 111 to be determined, for example. Alternatively or additionally, other visual features or reference points (e.g. a marking 411 that is shown in FIG. 4*b*) can also be used to identify the ground unit 111.

In addition, nonvisual features (e.g. identification that the vehicle 100 is situated in the reception range of the WLAN communication of the ground unit 111) can be used in order to identify the position of the ground unit 111 in the surroundings of the vehicle 100.

Furthermore, the control unit 133 may be set up to identify further reference points 402, 403 in the surroundings of the vehicle 100. The reference points 402, 403 may be situated on the ground (i.e. in the ground plane z=0). Alternatively or additionally, reference points 402, 403 above or below the ground plane (z< >0) can also be used. In the example shown in FIG. 4*a*, corner points 402 and/or edges of the boundary 201 of the parking bay that contains the ground unit 111 are identified. Furthermore, it is possible to identify a corner point of the pillar 202, for example. The control unit 133 may be set up to determine the position of the ground unit 111 relative to the further reference points 402, 403. It is therefore possible for the further reference points 402, 403 to be used to position the secondary coil 102 of the vehicle 100 above the ground unit 111, even when the ground unit 111 is no longer captured by the ambient sensors 131, 132 (e.g. because the ground unit 111 is already under the vehicle 100).

The control unit 133 may be set up to use the ascertained reference points 401, 402, 403 to determine the position of the vehicle 100 relative to the ground unit 111. Furthermore, the control unit 133 may be set up to determine the relative motion of the vehicle 100 (relative to the ground unit 111). The relative motion of the vehicle 100 can be ascertained via the motion of the objects 111, 201, 202 identified in the images and reference points 401, 402, 403. In other words, the progression of the captured data from the ambient sensors 131, 132 over time (e.g. a time sequence of images)

can be used to ascertain the motion of particular objects 111, 201, 202 and/or particular reference points 401, 402, 403. Furthermore, the steering angle of the vehicle 100 and/or the rotation of the wheels of the vehicle 100 can be ascertained. The control unit 133 may be set up to ascertain the relative motion of the vehicle 100 from this information. In particular, the control unit 133 may be set up to track the position of the vehicle 100 relative to the ground unit 111 (even when the ground unit 111 can no longer be captured by the ambient sensors 131, 132).

By way of example, the control unit 133 may be set up to capture and store a graphical representation (e.g. as a "top view" representation) of the charging station (and particularly of the ground unit 111) at the beginning of the positioning operation (for example see left-hand image in FIG. 3). As the positioning operation progresses further, the control unit 133 may be set up to update the position of the vehicle 100 relative to the charging station (particularly relative to the ground unit 111). Even if particular portions of the charging station (particularly the ground unit 111) can no longer be captured by the ambient sensors 131, 132 of the vehicle 100 (e.g. because they are concealed), these portions (particularly the ground unit 111) can nevertheless continue to be displayed on the basis of the stored graphical representation of the charging station (as shown in the images of FIG. 3). This makes it easier for the driver to position the secondary coil 102 of the vehicle 100 over the ground unit 111.

As already explained, in proximity, when the vehicle 100 is over the ground unit 111, typically only the further reference points 402, 403 and the ambient sensors 131, 132 are then available for distance measurement between ground unit 111 and secondary coil 102. For this reason, the control unit 133 is typically set up to track the entire approach trajectory in order to find the position of the vehicle 100. In particular, the control unit 133 is typically set up to determine a starting position for the vehicle 100 relative to the ground unit 111 right from when the ground unit 111 can still be captured by the ambient sensors 131, 132. Furthermore, the control unit 133 may be set up to update the position of the vehicle 100 continuously from the starting position. The update can take place on the basis of the ascertained motion of the further reference points 402, 403 and/or the further objects 201, 202, and also on the basis of the vehicle-internal information (such as steering angle and/or wheel rotation). This allows the vehicle 100 to be positioned precisely over the ground unit 111, even when the ground unit 111 can no longer be captured by the ambient sensors 131, 132.

Furthermore, in direct proximity to the ground unit 111, a quality indicator for the magnetic coupling between the primary coil 111 and the secondary coil 102 can be used to check the final position.

Figure 5A:
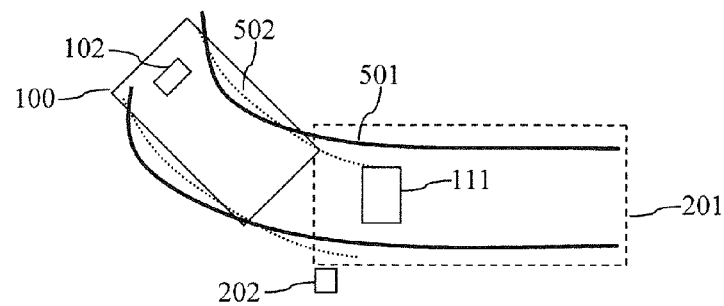
FIG. 5A and FIG. 5B each show an exemplary representation of a vehicle trajectory for assisting the driver in positioning the vehicle.
Figure 5B:
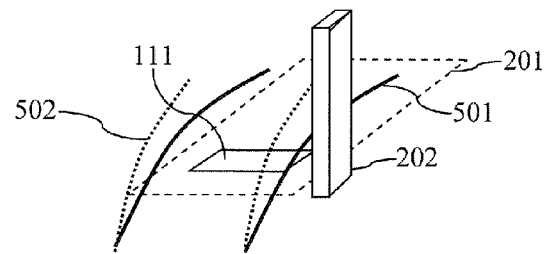

The control unit 133 may be set up to ascertain an intended trajectory 501 for the vehicle 100 from a current position of the vehicle 100 (see FIGS. 5a and 5b). The intended trajectory 501 can be displayed to the driver on the screen 134 (in connection with the graphical representation of the surroundings of the vehicle). The intended trajectory 501 indicates which positioning operation can be used to position the vehicle 100 over the ground unit 111 as precisely as possible. Furthermore, the control unit 133 may be set up to take the current steering angle as a basis for ascertaining an actual trajectory 502 of the vehicle 100 and to display it on the screen 134. This allows the driver to adjust the actual trajectory 502 (particularly the steering angle) such that the actual trajectory 502 approximates the intended trajectory 501. This assists the driver in positioning the vehicle 100.

Figure 6:
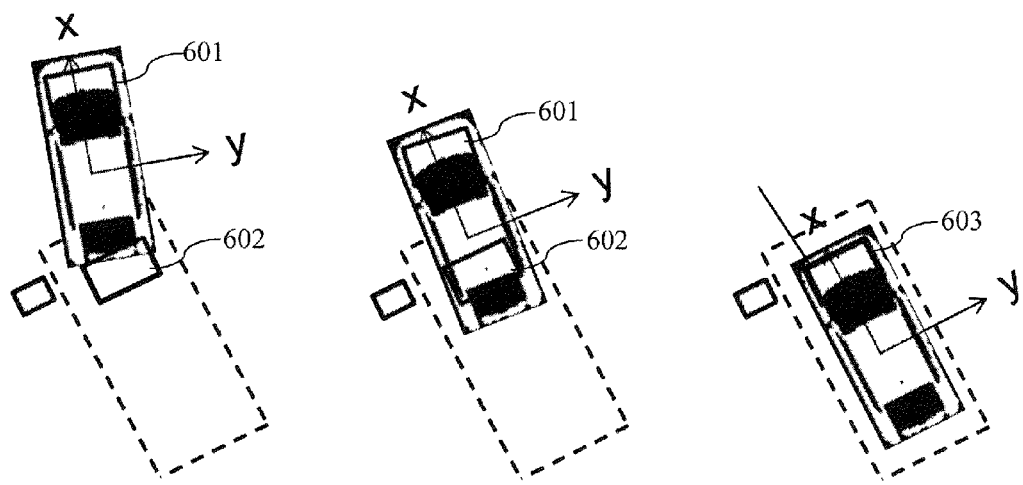
FIG. 6 illustrates the exemplary representation of the primary coil on a screen of the vehicle for assisting the driver in positioning the vehicle.

FIG. 6 shows a further way in which the driver can be assisted in a positioning operation. As already explained above, both the position of the secondary coil 102 of the vehicle 100 and the position of the ground unit 111 can be displayed on the screen 134 continuously by symbols 601, 602, even when the ground unit 111 is no longer captured by the ambient sensors 131, 132. This allows the displayed symbols 601, 602 to be aligned for the driver, and thus allows the secondary coil 102 to be positioned precisely over the primary coil 111. The displayed symbols 601, 602 can be altered on the basis of the quality of the positioning in order to inform the driver about the progress of the positioning. By way of example, the color of the symbols 601, 602 can be altered (e.g. green, yellow, red) in order to show the quality of the positioning. In the example shown in FIG. 6, a green symbol 603 shows sufficiently precise superposition of the primary coil 111 and secondary coil 102. Such a representation allows the driver to position the vehicle 100 precisely even without the display of an intended trajectory 501. In other words, the representation shown in FIG. 6 allows the vehicle 100 to be positioned even without an intended trajectory 501. To this end, the "top view" representation is continued with the images under the vehicle 100 that are captured during the approach. The position of the secondary coil 102 is displayed to the driver in a transparent silhouette of the vehicle. The position of the secondary coil 102 can then be matched to the image 602 of the primary coil 111.

Further refinements of the positioning method described above are possible. By way of example, permanent monitoring of the vehicle surroundings (using the ambient sensors 131, 132) during the charging operation can be used to identify that an animal (e.g. a cat) runs under the vehicle 100. This allows the safety of the charging operation to be increased. In particular, the charging power could be reduced in such cases in order to reduce hazard for the animal as a result of high field strengths.

The positioning method described can be combined with an automatic parking assistance function. In particular, an automatic parking function can be used on the basis of the reference points 401, 402, 403 and/or the reference objects 111, 201, 202 and also on the basis of the starting position of the vehicle 100 in order to position the vehicle 100 over the ground unit 111 (e.g. on the basis of the intended trajectory 501).

The control unit 133 may be set up to learn reference points 401, 402, 403 when a charging station is approached repeatedly. This allows a primary coil 111 to be approached even when the primary coil 111 is not visible, e.g. when the primary coil 111 is concealed by a blanket of snow. In addition, this can continuously improve the precision of the positioning.

As explained above, further reference points 402, 403 can be used in order to assist the positioning operation. The reference points 402, 403 can also be situated above the ground plane (z>0). The reference points 402, 403 can be produced both through teaching and through identification of a pattern 411 that is typical of the charging station. Furthermore, alternative reference points can be used in order to approach even completely concealed primary coils 111 (e.g. those inset in the ground).

As described above, the controller 133 may be set up to detect reference objects 201, 202 and/or reference points 401, 402. These reference objects 201, 202 and/or reference points 401, 402 can be detected by image analysis methods.

Furthermore, the geometric arrangement of the reference objects 201, 202 and/or reference points 401, 402 can be ascertained on the basis of the data from the ambient sensors 131, 132.

In order to reduce the complexity of the ascertainment of the reference objects 201, 202 and/or reference points 401, 402 and of the ascertainment of the geometric arrangement and in order to increase the reliability of the ascertained information, it may be advantageous to use predefined markings or predefined reference objects. Information about such predefined reference objects can be made available to the control unit 133 as reference data. This allows the ascertainment of the position of the secondary coil 102 relative to the ground unit 111 to be improved.

Figure 7A:
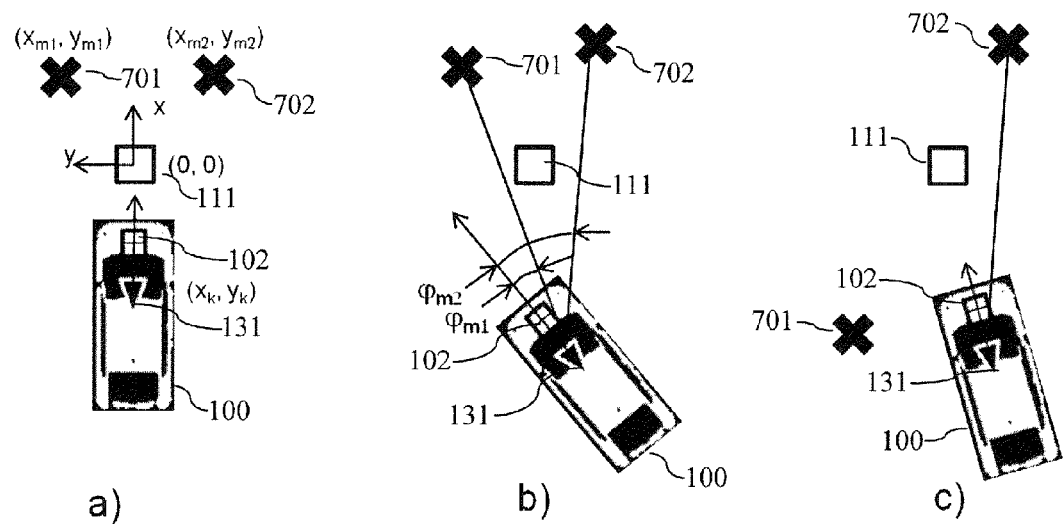
FIG. 7A illustrates exemplary positions of predefined reference objects.
Figure 7B:
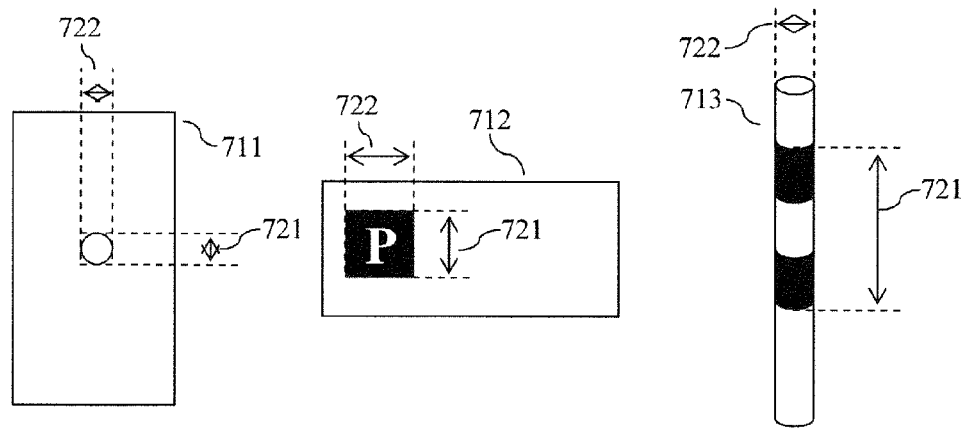
FIG. 7B illustrates exemplary reference objects.

FIG. 7a shows various arrangements of predefined reference objects 701, 702 (e.g. predefined markings) and FIG. 7b shows examples of predefined reference objects that can be detected by the control unit 133 of the vehicle 100 on the basis of the captured image data from a vehicle camera 131. The ground unit 111 may be positioned in a predefined manner relative to the one or more reference objects 701, 702. Hence, the position of the ground unit 111 can be ascertained by determining the position of the one or more reference objects 701, 702. In particular, the position of the ground unit 111 relative to the vehicle 100 can be ascertained by determining the position of the one or more reference objects 701, 702 relative to the vehicle 100.

As shown in image a) in FIG. 7a, the reference objects 701, 702 can be assigned coordinates in a coordinate system (e.g. a Cartesian coordinate system). In the example shown, the ground unit 111 is arranged in the center of the coordinate system. The position of a reference object 701 can therefore be described by coordinates (x, y) in this coordinate system. In the same way, the position of the vehicle 100, e.g. the position of a camera 131 of the vehicle, can be described by coordinates (x, y) of the coordinate system. Knowledge of the position of the ground coil 111 and the position of the vehicle 100 in a predefined coordinate system allows the control unit 133 to assist the driver of the vehicle 100 in positioning the secondary coil 102 over the ground unit 111.

Image b) in FIG. 7a indicates that the orientation of the vehicle 100 relative to the ground unit 111 can also be ascertained on the basis of the predefined reference objects 701, 702. In particular, the camera angles $\phi_{m1}$ and $\phi_{m2}$ between the longitudinal axis of the vehicle 100 and the ray between camera 131 and reference object 701, 702 can be captured.

Image c) in FIG. 7a shows an example in which the reference objects 701, 702 cannot be captured by the camera 131 of the vehicle 100 simultaneously. By way of example, the first reference object 701 may be positioned at a garage entrance, and the second reference object 702 may be arranged at the primary electronics 110 (i.e. the power supply 110) of the charging station. As shown in connection with FIG. 8d, reference objects 701, 702 separated in this manner can be used to assist in the whole positioning operation of the vehicle 100 (including at long range).

FIG. 7b shows exemplary reference objects 711, 712, 713. The reference objects should be arranged in an illuminated area, or they should be self-illuminating, or they should be arranged in an area that can be illuminated by the vehicle headlamps. In other words, there should be the assurance that the reference objects can be reliably captured by the camera 131 of the vehicle 100. By way of example, the reference object can include an illuminated marking 711 at the electronics 101 for actuating the primary coil 111 (e.g. integrated in a wall box for wired charging). The illumination can be actuated and switched on by means of a radio link that exists between charging station and vehicle during the positioning operation. The illumination can also acknowledge when the correct final position is reached, for example, by switching off. Alternatively or in addition, the marking 711 can be a sticker on the primary electronics 110.

Alternatively or in addition, permanent markings 712, 713 that are in place in the environment of the parking space at which the charging station is situated can be used as reference objects (e.g. a car park sign 712 or a pillar 713), provided that these markings 712, 713 have sufficient contrast.

The dimensions 721, 722 of the predefined reference objects 711, 712, 713 can be used to determine the distance between camera 131 and reference object 711, 712, 713. The actual dimensions 721, 722 (e.g. height, width) of the reference objects 711, 712, 713 are known to the control unit 131, which means that the distance between reference object 711, 712, 713 and vehicle camera 131 can be ascertained from the dimensions of the reference objects 711, 712, 713 as ascertained on the basis of the image data of the vehicle camera 131. Alternatively or in addition, it is also possible to use data from distance sensors 132 of the vehicle 100 to ascertain the distance.

The use of a predefined reference object 701 having predefined dimensions 721, 722 allows the control unit 133 to ascertain the distance from the vehicle 100 to the reference object and the orientation of the vehicle 100 relative to the reference object. Since the one or more reference objects 701, 702 are arranged in a predefined manner relative to the ground unit 111, this allows the secondary coil 102 of the vehicle 100 to be positioned over the ground unit 111 on the basis of the data from the vehicle camera 131.

Figure 8A:
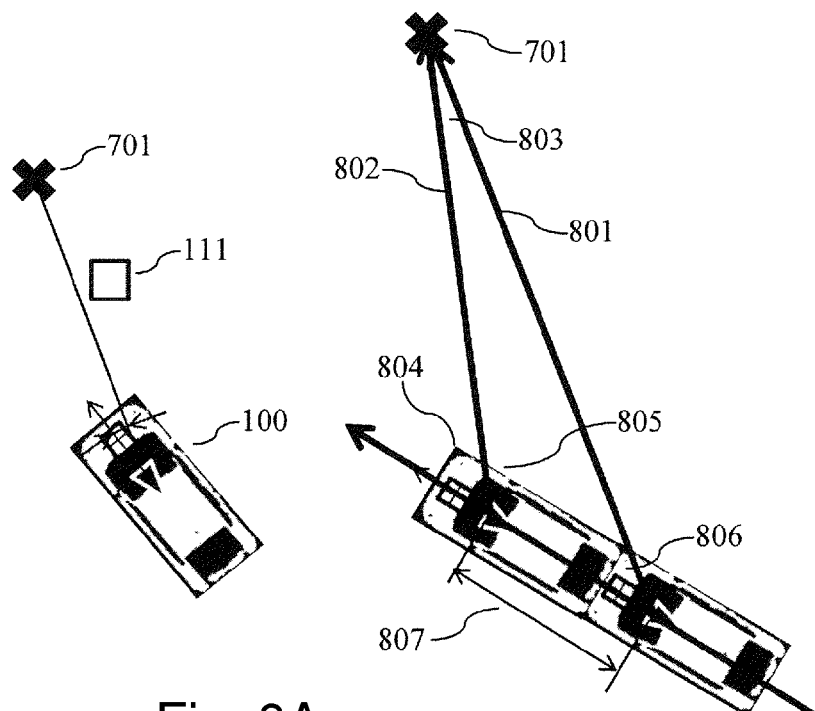
FIG. 8A, FIG. 8B, FIG. 8C and FIG. 8D show the exemplary use of predefined reference objects for positioning a vehicle.

To ascertain the distance between a reference object 701 and the camera 131 of the vehicle 100, it is possible to use triangulation methods. This is shown by way of example in FIGS. 8a and 8b. It is true that the sum of the angles 804 ($\phi_{m1\_2}$) and 805 ($\phi_{m1\_b2}$) gives 180° and that the sum of the angles 803 ($\phi_{m1\_12}$), 805 ($\phi_{m1\_b2}$) and 806 ($\phi_{m1\_1}$) gives 180°. The sine rule $$\frac{s_{12}}{\sin(\varphi_{m1\_12})} = \frac{s_{m1\_2}}{\sin(\varphi_{m1\_1})}$$

(where s12 is the distance moved 807 by the vehicle 100, and where $s_{m1\_2}$ is the current distance 802 from the vehicle 100 to the reference object 701) gives $$s_{m1\_2} = s_{12}\frac{\sin(\varphi_{m1\_1})}{\sin(\varphi_{m1\_12})} = s_{12}\frac{\sin(\varphi_{m1\_1})}{\sin(\varphi_{m1\_2} - \varphi_{m1\_1})}.$$

Therefore, knowledge of the camera angles 806, 804 at two successive instants and knowledge of the distance 807 covered between these two instants allows the current distance 802 from the vehicle 100 to the reference object 701 to be determined.

For the special case in which $\phi_{m1\_2} - \phi_{m1\_1}$ is small or zero (i.e. if the vehicle 100 moves directly toward the reference object 701), it is admittedly not possible to compute the distance 802 using the aforementioned triangulation formula. In this case, however, the vehicle distance 807 directly provides information about how the distance between vehicle 100 and reference object 701 changes. In particular, the change of distance between the distance 801 at the first instant and the current distance 802 (at the second instant) then corresponds to the vehicle distance 807.

Figure 8B:
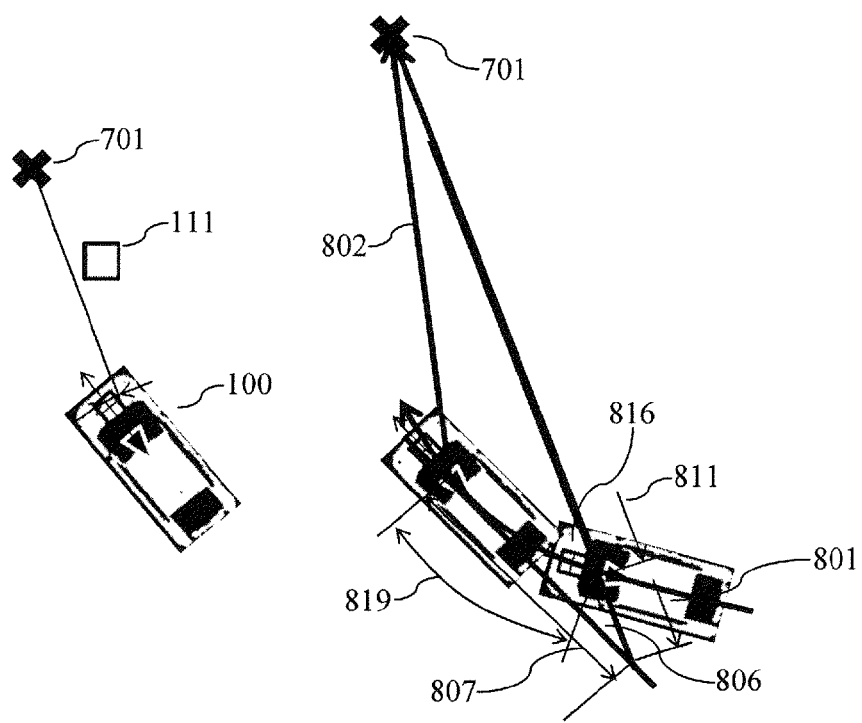

Even when the steering is turned, triangulation methods allow the distance 802 between reference object 701 and vehicle 100 to be ascertained by measuring the camera angles 804, 806 and by measuring the distance moved 807 by the vehicle 100 (e.g. on the basis of the wheel rotation). As shown in FIG. 8b, values for the corrected distance moved 807 and the corrected angle 806 can be ascertained from the measured variables: camera angle 816 at the first instant, steering turn or rotation and distance moved 819. The current distance 802 (at the second instant) is then obtained using the triangulation formula described above.

Figure 8C:
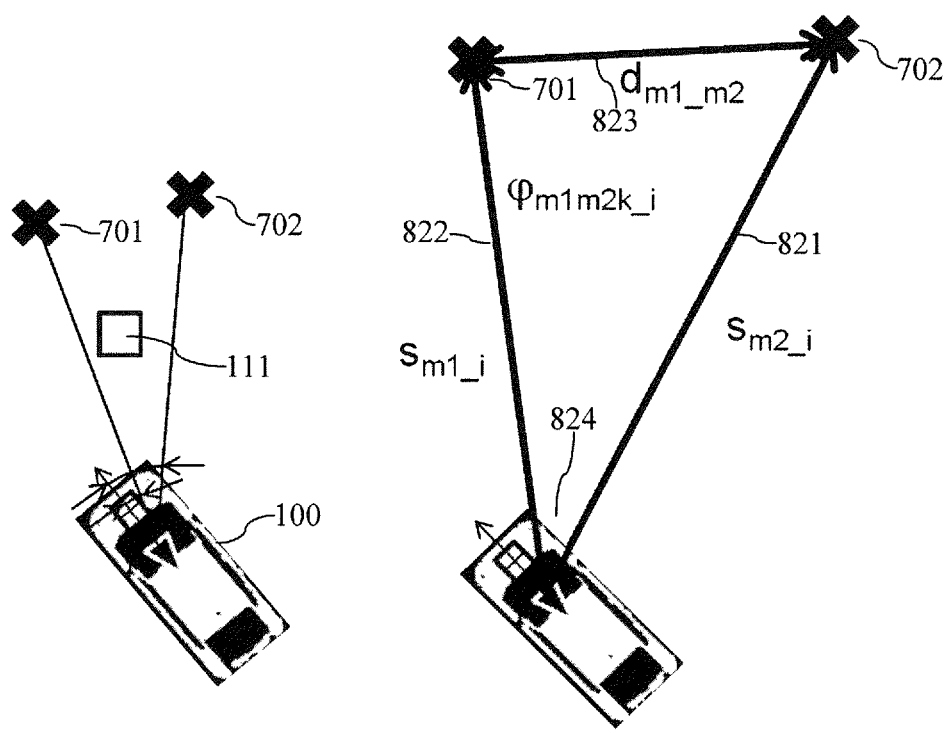

The absolute position of the vehicle can be ascertained on the basis of the identification of at least two reference objects 701 and 702, as shown in FIG. 8c. In particular, all requisite coordinates and angles can be computed from the distances 822 and 821 to the two reference objects 701, 702. The distances 822, 821 can be ascertained by the methods described above. By way of example, the angle $\varphi_{m1m2k\_i}$ can be ascertained using the formula $$\varphi_{m1m2k\_i} = \arccos\left(\frac{s_{m1\_i}^2 + d_{m1\_m2}^2 - s_{m2\_i}^2}{2 s_{m1\_i} d_{m1\_m2}}\right),$$

where $d_{m1\_m2}$ is the predefined distance 823 between the two reference objects 701, 702. Hence, the coordinates and the orientation of the vehicle 100 (i.e. the position and orientation of the secondary coil 102 of the vehicle 100) can be ascertained. The coordinates of the reference objects 701, 702 and of the primary coil 111 are known, which therefore means that all the requisite information for positioning the vehicle 100 is available.

The use of a series of reference objects 701, 702 allows the whole approach trajectory of the vehicle 100 to be accompanied and assisted. To this end, predefined reference objects 701, 702 may be placed along the approach trajectory, so that where possible at least one reference object 701, 702 can always be captured by the camera 131 of the vehicle. This is shown by way of example in FIG. 8d. While the vehicle 100 is approaching, position computation (e.g. using the methods described above) is performed at different instants i (i=1 . . . n, where n corresponds to the instant at which the target position is reached). To this end, where possible at least one reference object 701, 702 can always be captured by the camera 131.

Figure 8D:
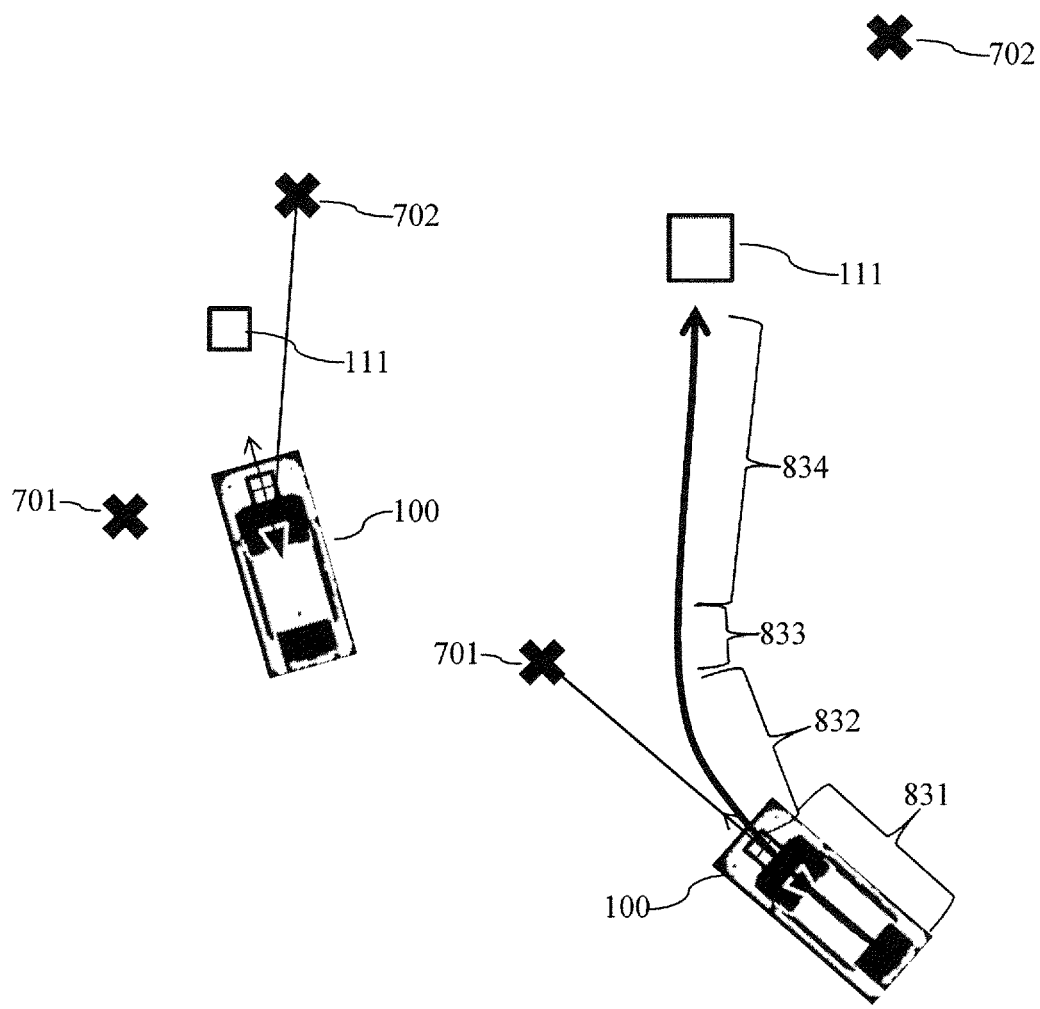

In the example shown in FIG. 8d, the vehicle 100 moves in the trajectory section 831 directly toward the first reference object 701. The distance between vehicle and first reference object can be estimated using the size of the first reference object 701 as captured by the camera 131, for example (see FIG. 8a). In the trajectory section 832, the distance to the reference object 701 can be determined using triangulation. In the trajectory section 833, the camera 131 of the vehicle 100 does not capture a reference object 701, 702. The distance and angle to the reference object 701 can be tracked using vehicle sensors (wheel rotation and/or steering angle). In the trajectory section 833, the camera 131 of the vehicle 100 captures the second reference object 702. The distance and relative position of the vehicle 100 in relation to the primary coil 111 can be continually updated until the target position is reached. Therefore, the control unit 133 may be set up to assist the driver of the vehicle 100 in positioning along the entire trajectory.

The geometry of a charging station (i.e. particularly the coordinates of the reference objects 701, 702; the dimensions 721, 722 of the reference objects 701, 702; the description of the reference objects 701, 702 (for automatic identification); and/or the relative position of the ground unit) may be stored on a memory unit in the vehicle 100. The control unit 133 can access this memory unit when required. By way of example, the geometry of a charging station can be transmitted from the charging station (e.g. from the primary electronics 110) to the vehicle 100 via a wireless communication link (e.g. when the vehicle 100 approaches).

Figure 9:
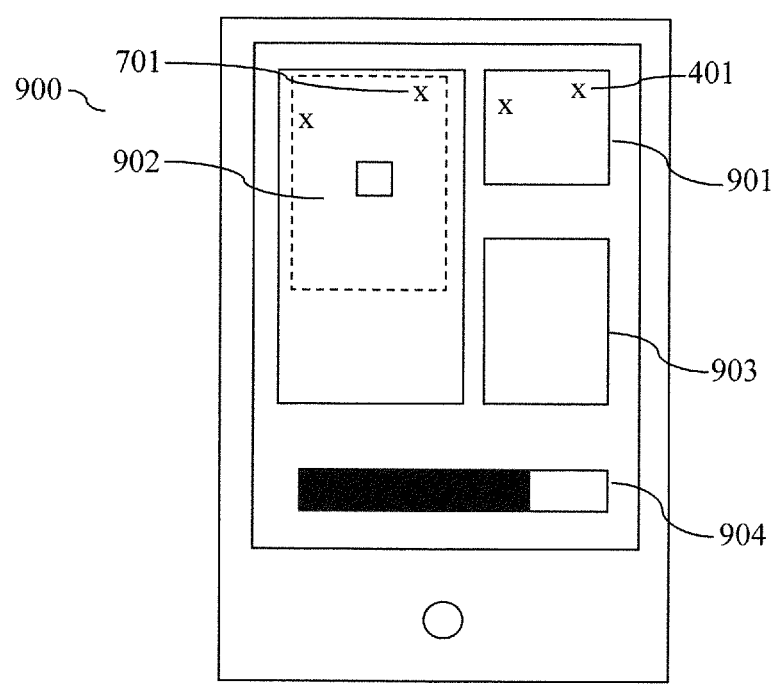
FIG. 9 is a schematic diagram showing an exemplary user interface for an application for defining predefined reference objects.

An application can be provided that assists a user in ascertaining the geometry of a charging station. The interface 900 of an exemplary application (e.g. an application for a Smartphone or for the onboard computer of the vehicle 100) is shown in FIG. 9. Images 901 of the charging station can be shown that allow one or more reference objects or reference points 401 to be selected. By way of example, the images 901 can be taken using the camera 131 of the vehicle 100 or using a camera of the Smartphone. The description of a reference object (size, shape, color, etc.) can be ascertained and captured. The reference objects from the image can be included as reference objects 701 in an outline 902 of the charging station and combined with the description of the corresponding reference objects. The measurements 721, 722 and positions of the reference objects 701 and of the primary coil 111 can be inserted in the outline 902. In addition, information about the type of vehicle used can be inserted. This results in the position of the camera 131 and the secondary coil 111 in the vehicle 100. The input can be performed manually, or by means of data transmission from the vehicle 100 to the application. Furthermore, information 903, 904 regarding the setup of the charging station (such as the quality of the setup and/or further steps to be performed) can be ascertained and displayed.

In one exemplary method, a first step can involve the primary unit 110, 111 and the reference objects (e.g. markers) being placed. The vehicle camera 131 or a tablet PC camera can then be used to photograph the reference objects. The data from the vehicle (geometry and possibly images), which are intended to have the charging station used for them, can be transmitted to the tablet PC. This information can then be used to configure the charging station (as described in FIG. 9). The data concerning the charging station can then be stored in the off board electronics 110 (also called primary electronics or pilot unit) of the charging station and transmitted to the vehicle 100. Knowledge of the data concerning the charging station allows the control unit 133 of the vehicle 100 to ascertain the relative position of the vehicle 100 in relation to the ground unit 111. Optionally, the control unit 133 may be set up to prompt the primary electronics 110 to illuminate the reference objects from the beginning of the positioning operation, so that they can be captured sufficiently well by the camera 131 of the vehicle 100. Furthermore, an illuminated reference object can be used for acknowledging a successful positioning operation by virtue of appropriate actuation.

To position another type of vehicle, the data concerning the reference objects can be transmitted from the off board electronics 110 of the charging station, or from a database in a network, to the memory unit of the vehicle 100 (e.g. when the vehicle 100 approaches). The vehicle 100 then uses its known vehicle geometry to compute the complete data and can thus assist the positioning operation.

The use of a charging station with predefined reference objects 701, 702 presupposes that the position of the ground unit 111 does not change relative to the predefined reference objects 701, 702. However, the ground unit 111 may be a shallow body on a nonslip mat, for example, said body not being firmly screwed to the ground. As a result, it is possible for the ground unit 111 to be moved unnoticed, as a result of which effective positioning of the secondary coil 102 over the ground unit 111 can no longer take place. The charging station (and the vehicle) should be set up to identify movement of the ground unit 111. The identification of movement should work even when a vehicle is not being charged or when there is no vehicle over the primary coil. In addition, identification should be possible even during a power failure. To solve this problem, the ground unit 111 may be positioned on a mechanical sensor ball, with the sensor ball recording motion by the ground unit 111. Alternatively or in addition, the ground unit 111 may be placed along a marking on the ground. An optical sensor of the ground unit 111 can then identify whether the ground unit 111 is still arranged along the marking or whether the ground unit 111 has been moved.

This means that, in order to prevent an incorrect position from being approached when a ground unit 111 has moved, the ground unit 111 can have a sensor fitted that identifies motion (slipping, lifting, etc.) by the ground unit 111. After the ground unit 111 has moved, the driver can be notified and if need be asked to check the position.

It should be pointed out that, in addition to one or more vehicle cameras 131, further external cameras can also be used. The external cameras can be used to capture the motion of the vehicle 100. The data from the one or more external cameras can be used with the data from the one or more vehicle cameras 131 for optimized position finding.

This document has described a method and an apparatus (control unit) that assist the driver of a vehicle 100 in positioning the vehicle 100 over a ground unit 111. The method and the apparatus allow the use of components 131, 132 already in place in the vehicle 100 for positioning. As a result, the method and the apparatus can be implemented inexpensively (e.g. by software). In particular, the cameras 131 are today already integrated in vehicles 100 in optimum fashion (e.g. at positions with little soiling) for all-round vision, so that these properties can be used at the same time. The intended position can be displayed in a known representation, e.g. top or rear view representation. Therefore, provision of the positioning function described does not require a new form of presentation, and the positioning function described can be implemented as part of a consistent interface having other driver assistance functions. Furthermore, possible errors in the optical system (e.g. soiling of a camera 131) can be conclusively identified by the driver in the image shown, and therefore do not result in the vehicle being incorrectly positioned. The method described in this document therefore allows reliable positioning of the vehicle.

Furthermore, the suitable choice of predefined reference objects allows the implementation of positioning that is independent of soiling and weather (e.g. snow). The installation of the charging station and the capture of the geometric data from the charging station can also be effected without a vehicle (e.g. using a tablet PC). Capture of the reference objects can be optimized through the use of original images from the vehicle camera and assisted by means of offline handling. This allows the reliability of the system to be increased. In addition, the use of the vehicle camera and the controller allow information from the chassis (steering angle, wheel rotation) about the vehicle motion to be used directly in the vehicle in a simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a vehicle having a secondary coil for picking up electric power from a vehicle-external primary coil, wherein the vehicle has at least one camera configured to capture surroundings of the vehicle, wherein the control unit is configured to execute instructions stored on a computer-readable medium to:
   receive from the at least one camera, image data of the surroundings of the vehicle captured by the at least one camera;
   access reference data comprising information about at least one predefined reference object located within the captured surroundings of the vehicle, the information at least determinative of an identity of the at least one predefined reference object and/or a position of the at least one predefined reference object relative to the primary coil;
   detect a presence of the at least one predefined reference object in the received image data based on the accessed reference data;
   ascertain the position of the secondary coil relative to the primary coil based on the detected at least one predefined reference object; and
   generate a graphical representation of the secondary coil with respect to the primary coil based on the ascertained position of the secondary coil relative to the primary coil.

2. The control unit according to claim 1, wherein the reference data comprises one or more of:
   information about visual features of the at least one reference object that are able to be detected in the image data from the camera;
   information about a physical size of the at least one reference object;
   information concerning spatial coordinates of the at least one reference object in a predefined coordinate system; and
   information concerning spatial coordinates of the primary coil in the predefined coordinate system.

3. The control unit according to claim 1, wherein the control unit is configured to further execute instructions stored on the computer-readable medium to:
   receive information concerning a steering turn and concerning a wheel speed of the vehicle; and
   ascertain a motion of the vehicle relative to the at least one reference object based on the received steering turn and wheel speed information.

4. The control unit according to claim 1, wherein the control unit is configured to further execute instructions stored on the computer-readable medium to:
   ascertain a camera angle for a ray between the at least one camera and the at least one reference object; and
   ascertain a distance from the secondary coil to the at least one reference object based on the ascertained camera angle.

5. The control unit according to claim 1, wherein
   the reference data comprise information about a multiplicity of predefined reference objects along an approach trajectory of the vehicle with respect to the primary coil; and the control unit is configured to further execute instructions stored on the computer-readable medium to:
receive a time sequence of image data from the at least one camera of the vehicle along the approach trajectory; and
detect the multiplicity of predefined reference objects in the time sequence of image data.

6. The control unit according to claim 1, wherein the control unit is configured to further execute instructions stored on the computer-readable medium to:
receive the reference data from a pilot unit of the primary coil.

7. The control unit according to claim 5, wherein the control unit is configured to further execute instructions stored on the computer-readable medium to:
receive the reference data from a pilot unit of the primary coil.

8. The control unit according to claim 1, wherein the control unit is configured to further execute instructions stored on the computer-readable medium to:
prompt a control signal to be sent to a pilot unit of the primary coil in order to illuminate the at least one predefined reference object.

9. The control unit according to claim 7, wherein the control unit is configured to further execute instructions stored on the computer-readable medium to:
prompt a control signal to be sent to a pilot unit of the primary coil in order to illuminate the at least one predefined reference object.

10. A vehicle, comprising:
a secondary coil for picking up electric power from a vehicle-external primary coil;
at least one camera configured to capture surroundings of the vehicle;
a control unit for the vehicle, wherein the control unit is configured to:
receive image data from the at least one camera of the vehicle;
access reference data comprising information about at least one predefined reference object in the captured surroundings of the vehicle, the information at least determinative of a presence of the at least one predefined reference object and/or a position of the at least one predefined reference object relative to the primary coil;
detect the presence of the at least one predefined reference object in the received image data based on the accessed reference data;
ascertain the position of the secondary coil relative to the primary coil based on the detected presence of the at least one predefined reference object, and
generate a graphical representation of the secondary coil with respect to the primary coil based on the ascertained position of the secondary coil relative to the primary coil;
a memory unit configured to store the reference data; and
a display configured to display the graphical representation.

11. The vehicle according to claim 10, wherein the reference data comprises one or more of:
information about visual features of the at least one reference object that are able to be detected in the image data from the camera;
information about a physical size of the at least one reference object;
information concerning spatial coordinates of the at least one reference object in a predefined coordinate system; and
information concerning spatial coordinates of the primary coil in the predefined coordinate system.

12. The vehicle according to claim 10, wherein the control unit is configured to:
receive information concerning a steering turn and concerning a wheel speed of the vehicle; and
ascertain a motion of the vehicle relative to the at least one reference object based on the received steering turn and wheel speed information.

13. The vehicle according to claim 10, wherein the control unit is configured to:
ascertain a camera angle for a ray between the at least one camera and the at least one reference object; and
ascertain a distance from the secondary coil to the at least one reference object based on the ascertained camera angle.

14. The vehicle according to claim 10, further comprising an onboard computer configured to permit a user to input the reference data.

15. A method for assisting in positioning a secondary coil of a vehicle relative to a vehicle-external primary coil, the method comprising the acts of:
receiving image data from at least one vehicle camera configured to capture surroundings of the vehicle;
receiving reference data comprising information about at least one predefined reference object in the captured surroundings of the vehicle, the information at least determinative of a presence of the at least one predefined reference object and/or a position of the at least one predefined reference object relative to the primary coil;
detecting the at least one predefined reference object in the received image data based on the received reference data;
ascertaining a position of the secondary coil relative to the primary coil based on the detected at least one reference object; and
generating a graphical representation of the secondary coil with respect to the primary coil based on the ascertained position of the secondary coil relative to the primary coil.

16. The method according to claim 15, wherein the reference data comprises information about a multiplicity of predefined reference objects; and the method additionally comprises the acts of:
detecting the multiplicity of predefined reference objects in the received image data; and
comparing the reference data with the detected multiplicity of predefined reference objects.

17. The method according to claim 15, wherein the reference data comprise one or more of:
information about visual features of the at least one reference object that are able to be detected in the image data from the camera;
information about a physical size of the at least one reference object;
information concerning spatial coordinates of the at least one reference object in a predefined coordinate system; and
information concerning spatial coordinates of the primary coil in the predefined coordinate system.

18. The method according to claim 15, wherein the method further comprises the acts of:

receiving information concerning a steering turn and concerning a wheel speed of the vehicle; and ascertaining a motion of the vehicle relative to the at least one reference object based on the received steering turn and wheel speed information.

19. The method according to claim 15, wherein the method further comprises the acts of:

ascertaining a camera angle for a ray between the at least one camera and the at least one reference object; and ascertaining a distance from the secondary coil to the at least one reference object based on the ascertained camera angle.

* * * * *